United States Patent
Pahl

(10) Patent No.: US 6,715,803 B1
(45) Date of Patent: Apr. 6, 2004

(54) QUICK-CONNECT EXPANSION COUPLING FOR ELECTRICAL METALLIC TUBING

(76) Inventor: Thomas L. Pahl, 4901 Culley La., Jackson, MI (US) 49201

( * ) Notice: Subject to any disclaimer, the term of this patent is extended or adjusted under 35 U.S.C. 154(b) by 0 days.

(21) Appl. No.: 10/194,634

(22) Filed: Jul. 13, 2002

(51) Int. Cl.$^7$ .................................................. F16L 21/00
(52) U.S. Cl. ..................... 285/404; 285/145.1; 285/302; 285/149.1
(58) Field of Search .............................. 285/404, 145.1, 285/145.4, 302, 298, 154.4, 149.1

(56) References Cited

U.S. PATENT DOCUMENTS

| | | | |
|---|---|---|---|
| 268,686 A | * 12/1882 | Kaiser | ......................... 285/404 |
| 2,455,180 A | * 11/1948 | Kennedy | ..................... 285/404 |
| 2,900,436 A | 8/1959 | Appleton | |
| 3,154,632 A | 10/1964 | Browne | |
| 3,272,537 A | * 9/1966 | Stone et al. | ................. 285/404 |
| 3,454,291 A | * 7/1969 | Goldsobel et al. | .......... 285/404 |
| 3,885,821 A | 5/1975 | Philibert | |
| 3,951,436 A | * 4/1976 | Hyde, Jr. | ..................... 285/404 |
| 4,091,523 A | * 5/1978 | Riecke | ........................ 285/404 |
| 4,304,424 A | * 12/1981 | Hansen | ........................ 285/404 |
| 4,438,954 A | * 3/1984 | Hattori | ........................ 285/404 |
| 5,466,890 A | 11/1995 | Stagnitti | |
| 5,654,526 A | * 8/1997 | Sharp | ......................... 285/404 |
| 6,106,031 A | * 8/2000 | Guginsky | ................... 285/404 |

* cited by examiner

*Primary Examiner*—David Bochna
(74) *Attorney, Agent, or Firm*—Young & Basile, P.C.

(57) ABSTRACT

An expansion coupling for interconnecting the terminal portions of separate first and second lengths of electrical metallic tubing to permit relative axial movement between the first and second lengths of electrical metallic tubing. The expansion coupling comprises a sleeve of thin-walled metal tubing having a principal length and an interior axial passageway terminating in opposing first and second openings. The first opening is dimensioned to receive therein in telescopic sliding relation a terminal portion of the first length of electrical metallic tubing. The second opening is dimensioned to receive therein a terminal portion of the second length of electrical metallic tubing. A movable member, such as a set-screw, etc., is positioned proximate the second opening, the movable member being selectively positionable within the axial passageway to secure the second length of tubing in fixed relationship with the sleeve. A stop extends into the passageway to define a limit of telescopic sliding movement for the first length of electrical metallic tubing relative to the sleeve. The coupling is further characterized in that, when a terminal portion of the second length of electrical metallic tubing is received in the second opening and fixedly secured in relationship to the sleeve, the terminal portion of the first length of electrical metallic tubing is freely telescopingly movable within the sleeve to thereby permit relative axial movement between the first and second lengths of electrical metallic tubing.

6 Claims, 3 Drawing Sheets

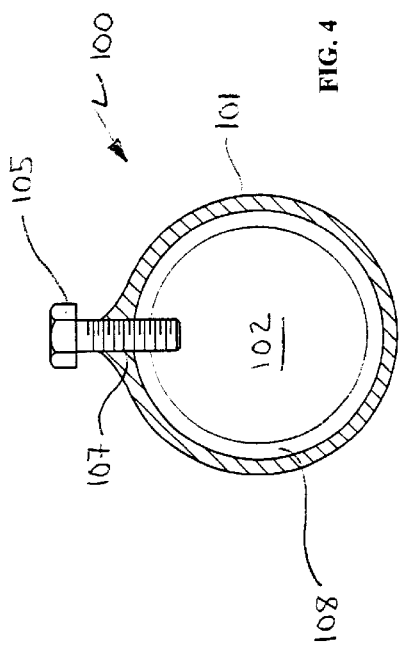
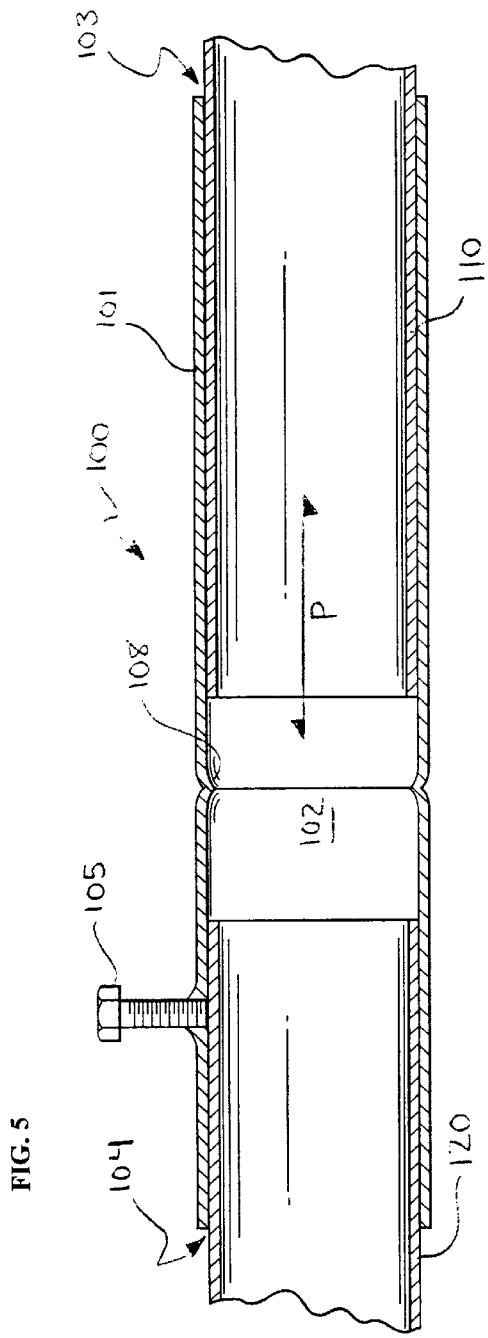
FIG. 4
FIG. 5

QUICK-CONNECT EXPANSION COUPLING FOR ELECTRICAL METALLIC TUBING

FIELD OF THE INVENTION

The present invention relates to couplings such as are employed in creating a movable junction between separate lengths of electrical metallic tubing in a run thereof so as to permit the expansion and contraction of such electrical metallic tubing in response to changes in temperature, etc. More particularly, the present invention relates to such an expansion coupling adapted to facilitate the simple and efficient interrelation thereof with the separate lengths of electrical metallic tubing.

BACKGROUND

It is conventional in many applications to run electric wiring within a relatively thin-walled metal tubing. In large scale installations involving extended runs of such tubing it is commonplace to position what are known as expansion couplings between separate lengths of tubing in order to allow for longitudinal expansion or contraction of the tubing as necessary in response to longitudinal expansion or contraction of the tubing material, such as may be occasioned by variations in temperature (as determined by the tubing material's coefficient of expansion), or by the expansion or contraction of the structure in which the run of tubing is installed, such as, for instance, at structural expansion joints. For runs of tubing for electrical wiring in particular, the National Electrical Code requires the employment of such expansion couplings at all building expansion joints.

Electrical metallic tubing ("EMT"), also known and referred to as thin-wall tubing because it is thinner than rigid metal tubing, is routinely employed as conduit for electrical wiring.

Broadly speaking, expansion couplings function to interconnect the terminal ends of separate lengths of tubing in a single run and permit sliding movement of one length of tubing relative to the other, as necessary, to accommodate expansion and contraction.

A conventional expansion coupling 5 for joining electrical wiring tubing, depicted in FIG. 1, includes a metal reducer 6 having one end threaded onto an end of a first length of tubing 7, and another end threadingly connected to a cylindrical metal sleeve 8. Threadingly connected to an opposite end of the sleeve 8 is a metal gland nut 9 encompassing a fiber gasket 10, a steel washer 11, and a packing 12 of asbestos and copper braid. The second length of tubing 13 passes through the packing 12, which is compressed against the tubing by tightening the gland nut 9. A plastic throat bushing 14 is threadingly connected to the end of the second length of tubing 13 to provide a smooth inner diameter against which the wires can engage.

Conventional expansion couplings, including such as described above, are routinely made from rigid metal, making them bulky. Such couplings are cumbersome to employ and, owing to their multitude of components, expensive to manufacture. In joining separate lengths of EMT, such conventional, rigid-metal expansion couplings must be retro-fitted in order to work properly with the thin-walled EMT. And particularly for indoor applications, where rain, snow, and the like are not a consideration, conventional expansion couplings such as the one described above are unnecessarily complicated in construction and operation.

Philibert, U.S. Pat. No. 3,885,821, discloses an expansion fitting adapted for coupling EMT, the fitting itself comprising a sleeve of EMT. While advantageous over prior art rigid metal expansion couplings, the Philibert device nevertheless suffers from several drawbacks, most notably in operation. More particularly, the Philibert device must be coupled to lengths of EMT by crimping or rolling the sleeve of the fitting after the ends of the lengths of EMT are inserted therein. In consequence, employment of the Philibert device in the field—that is, under actual installation conditions—is rendered problematic by the need to crimp the sleeve following insertion of the lengths of EMT to be joined.

It would therefore be desirable to provide an expansion coupling for EMT that is at once economical to manufacture and well suited for the simple and efficient joining of separate lengths of tubing in a given application, and which addresses the other limitations of prior art expansion couplings.

SUMMARY OF THE DISCLOSURE

The specification describes an expansion coupling for connecting separate first and second lengths of electrical metallic tubing to permit relative axial movement between the first and second lengths of electrical metallic tubing. According to the disclosure, the expansion coupling more particularly comprises a sleeve of thin-walled metal tubing having a principal length and an interior axial passageway terminating in opposing first and second openings. The first opening is dimensioned to receive therein a terminal portion of the first length of electrical metallic tubing in telescopic sliding relationship. A movable member is positioned proximate the second opening, the movable member being selectively positionable within the axial passageway to secure the second length of tubing in a fixed relationship with the sleeve. A stop extending into the passageway defines an inward limit of telescopic sliding movement for the first length of electrical metallic tubing relative to the coupling.

According to one feature of this invention, the movable member comprises a set screw that is selectively positionable within the passageway to secure the second length of electrical metallic tubing in fixed relationship with the coupling.

According to another feature of this invention, the wall of the sleeve is circumferentially indented to thereby define the stop.

BRIEF DESCRIPTION OF THE DRAWINGS

FIG. 4 is a cross-sectional view of the expansion coupling of FIG. 2; and

FIG. 5 is a cross-sectional view of the expansion coupling of this invention, shown in an operational environment in combination with separate lengths of tubing.

DESCRIPTION OF THE ILLUSTRATED EMBODIMENT

Figure 1:
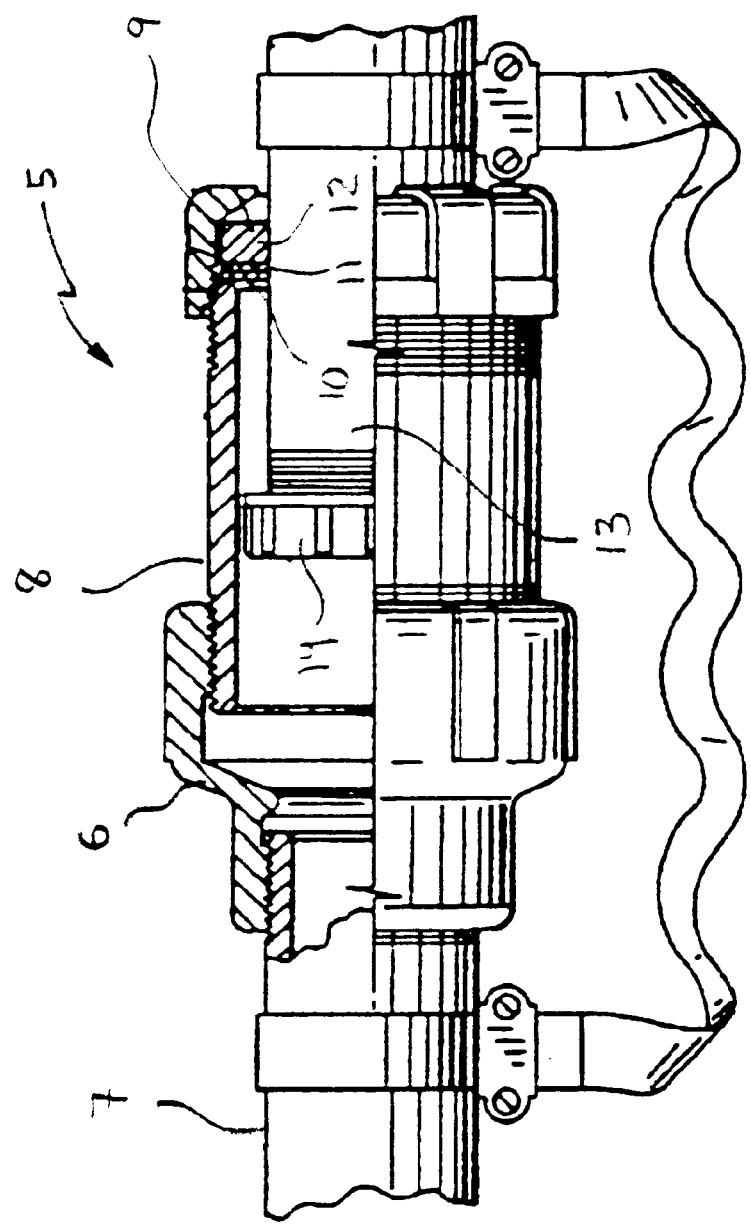
FIG. 1 shows a prior art expansion coupling.
Figure 2:
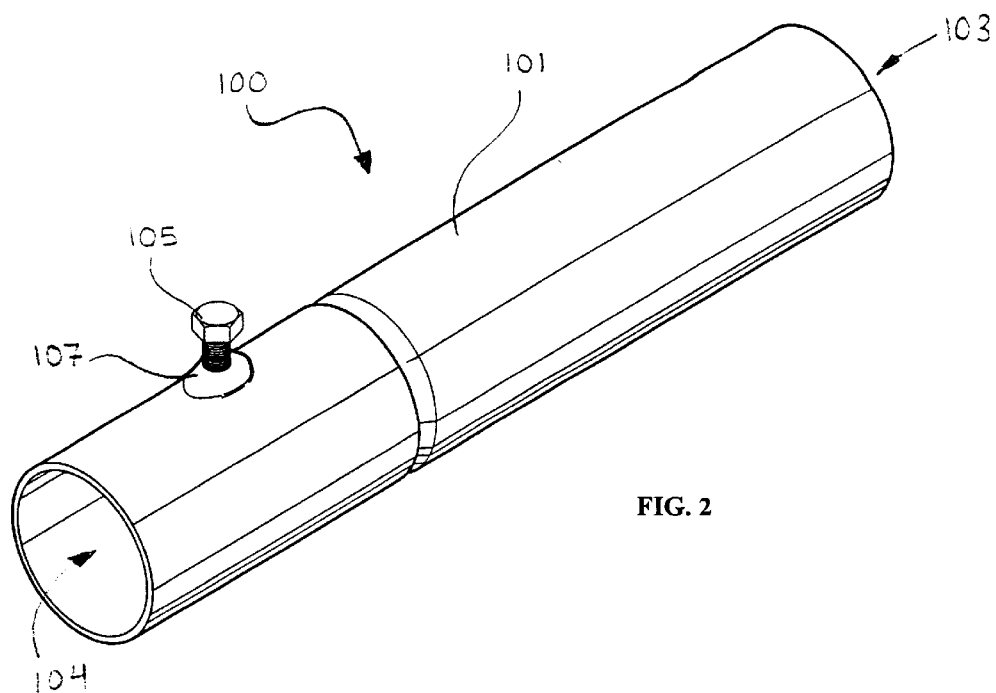
FIG. 2 is a quartering perspective view of the present inventive expansion coupling.
Figure 3:
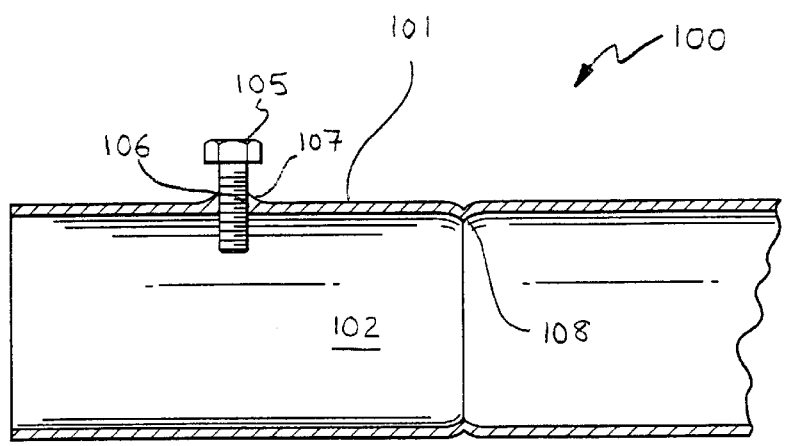
FIG. 3 is a cross-sectional view of the expansion coupling of FIG. 2.

Referring now to the drawings, wherein like numerals refer to like or corresponding parts, the present invention is shown in one embodiment thereof. Turning more particularly to FIGS. 2–4, the present invention will be seen to generally comprise an expansion coupling 100 for interconnecting separate lengths of electrical metallic tubing (now shown in FIGS. 2–4) to permit variations in the relative positions thereof, such as are occasioned by variations in temperature due to the coefficient of expansion of the constituent materials of the tubing, as well as by variations in the relative positions of the materials in the surrounding environment. More particularly, the expansion coupling 100 will be seen to comprise a sleeve 101 of thin-walled metal tubing having a principal length and an interior axial passageway 102 terminating in opposing first 103 and second 104 openings. The sleeve 101 is shown as having a cylindrical form, which shape is suited to most conventional applications, wherein the separate lengths of tubing are similarly shaped. Of course, the cross-sectional shape and overall dimensions of the sleeve 101 may be varied as occasioned by the particular application.

The sleeve 101 is preferably formed from a metal such as steel or aluminum, and most preferably from EMT, although other thin-walled materials may be substituted therefor.

Means are provided proximate the second opening 104 for selectively securing one of the separate lengths of electrical metallic tubing in fixed relationship with the sleeve 101. These means generally comprise a movable member 105 that is selectively positionable to intrude into the passageway 102 and secure the length of tubing in a fixed relationship with the sleeve 101. In the illustrated embodiment, the movable member 105 comprises a sets-crew disposed in a correspondingly threaded bore 106 provided in the wall of the sleeve 101 and communicating with the interior axial passageway 102. The set-screw is adjustably positionable within the bore 106 to selectively intrude into the interior axial passageway 102 in order to secure the length of electrical metallic tubing in fixed relationship with the coupling 100, all as described further hereinbelow. Also per the illustrated embodiment, the threaded bore 106 is partially defined in a boss 107 provided on the outer surface of the sleeve 101. Though only one movable member 105 is shown, it will be understood that two or more movable members may be provided, as desired. And of course, those of skill in the art will appreciate, with the benefit of this disclosure, that the means for selectively securing the second length of electrical metallic tubing in fixed relationship with the sleeve 101 are not limited to the above-described embodiments. Without limitation, other variants of these means may include one or more spring-biased detents, etc.

A stop 108 extending into the interior axial passageway 102 is characterized by radial dimensions sufficient to confront the movable length of tubing and define an inward limit of telescopic sliding movement therefor relative to the sleeve 101. According to the illustrated embodiment, the stop 108 is defined by an inwardly circumferentially indented portion of the wall of the sleeve 101, formed for instance by crimping. The stop 108 so formed is amenable to the inexpensive construction of the expansion coupling of this invention. Of course, the stop 108 may be otherwise formed, and the embodiment herein described is not intended to be so limiting of the invention.

Each of the first 103 and second 104 openings are of slightly larger inside diameter than the outside diameter of the respective length of tubing to be received therein, which dimensions of the openings will necessarily depend upon, and may therefore be altered to accommodate, the diameter of each separate length of tubing.

Referring now to FIG. 5, wherein the expansion coupling 100 of the present invention is shown in combination with the terminal portions of first 110 and second 120 lengths of tubing, the first length 110 of tubing is received in telescopic sliding relationship in the first opening 103, while the second length 120 of tubing is received in the opposite, second opening 104 and fixedly connected to the sleeve 101 by operation of the movable member 105. More particularly, upon receipt of the second length 120 of tubing in the second opening 104, the movable member 105, herein shown to comprise the aforedescribed set-screw, is threadingly positioned to intrude into the passageway 106 until it engages the outer surface of the second length 120 of tubing and secures it in place by capturing it between the movable member 105 and the interior surface of the sleeve 101, as illustrated. In this manner, it will be appreciated that the present invention provides a simple and efficient mechanism for fixedly connecting the expansion coupling 100 thereof with a length of tubing in an installation environment, thereby doing away with the need to adjust several separate components, or to crimp separate lengths of tubing together, such as characterize prior art expansion couplings.

Still referring to FIG. 5, it will be appreciated that axial back-and-forth movement of the first length of tubing 110 along a path of travel P within the passageway 102 is limited in an inward direction by the stop 108. Relative to travel of the first length of tubing 110 in an outward direction, those of skill in the art will understand that such travel is determined by the maximum anticipated contraction of the separate lengths of tubing, or such other factors as may affect their relative axial movement in a given application and, based upon these considerations, the overall length of the expansion coupling 100 is designed to insure that the first length of tubing 110 does not completely withdraw from the passageway 102 at the limit of outward movement.

Though not illustrated, the present inventive expansion coupling may be employed with conventional bonding jumpers, such as are oftentimes required in practice to insure a sufficient metallic bond between the separate lengths of tubing.

Of course, the foregoing is merely illustrative of the present invention, and those of ordinary skill in the art will appreciate that many additions and modifications to the present invention, as set out in this disclosure, are possible without departing from the spirit and broader aspects of this invention as defined in the appended claims.

The invention in which an exclusive property or privilege is claimed is defined as follows:

1. An expansion coupling for connecting the terminal portions of separate first and second lengths of electrical metallic tubing to permit relative axial movement between the first and second lengths of electrical metallic tubing, said coupling comprising:

a sleeve of tubing having a principal length and an interior axial passageway terminating in opposing, internally threadless first and second openings, said first opening dimensioned to receive therein in telescopic sliding relation a terminal portion of the first length of electrical metallic tubing, and said second opening dimensioned to receive therein a terminal portion of the second length of electrical metallic tubing;

a set screw positioned proximate the second opening, said set screw being selectively positionable within said passageway to fixedly secure the second length of electrical metallic tubing in fixed relationship with said sleeve;

a stop extending into said passageway to define a limit of telescopic sliding movement for the first length of electrical metallic tubing relative to said sleeve;

said sleeve being characterized by the absence, between the first opening and the stop, of any means for selectively securing the first length of electrical metallic tubing in fixed relationship with said sleeve; and said coupling being further characterized in that, when a terminal portion of the second length of electrical metallic tubing is received in said second opening and fixedly secured in relationship to said sleeve, the terminal portion of the first length of electrical metallic tubing is freely telescopingly movable in a substantially frictionless manner within said sleeve to thereby permit relative axial movement between the first and second lengths of electrical metallic tubing.

2. The expansion coupling of claim 1, wherein the wall of said sleeve is circumferentially indented to thereby define said stop.

3. An expansion coupling for connecting the terminal portions of separate first and second lengths of electrical metallic tubing to permit relative axial movement between the first and second lengths of electrical metallic tubing, said coupling comprising:

a sleeve of tubing having a principal length and an interior axial passageway terminating in opposing, internally threadless first and second openings, said first opening dimensioned to receive therein in telescopic sliding relation a terminal portion of the first length of electrical metallic tubing, and said second opening dimensioned to receive therein a terminal portion of the second length of electrical metallic tubing;

means proximate the second opening for selectively securing the second length of electrical metallic tubing in fixed relationship with said sleeve;

a stop extending into said passageway to define a limit of telescopic sliding movement for the first length of electrical metallic tubing relative to said sleeve;

said sleeve being characterized by the absence, between the first opening and the stop, of any means for selectively securing the first length of electrical metallic tubing in fixed relationship with said sleeve; and said coupling being further characterized in that, when a terminal portion of the second length of electrical metallic tubing is received in said second opening and fixedly secured in relationship to said sleeve, the terminal portion of the first length of electrical metallic tubing is freely telescopingly movable in a substantially frictionless manner within said sleeve to thereby permit relative axial movement between the first and second lengths of electrical metallic tubing.

4. The expansion coupling of claim 3, wherein the wall of said sleeve is circumferentially indented to thereby define said stop.

5. An expansion coupling for connecting the terminal portions of separate first and second lengths of electrical metallic tubing to permit relative axial movement between the first and second lengths of electrical metallic tubing, said coupling comprising:

a sleeve of tubing having a principal length and an interior axial passageway terminating in opposing, internally threadless first and second openings, said first opening dimensioned to receive therein in telescopic sliding relation a terminal portion of the first length of electrical metallic tubing, and said second opening dimensioned to receive therein a terminal portion of the second length of electrical metallic tubing;

a movable member positioned proximate the second opening, said movable member being selectively positionable within said axial passageway to capture the second length of tubing in fixed relationship with said sleeve;

a stop extending into said passageway to define a limit of telescopic sliding movement for the first length of electrical metallic tubing relative to said sleeve;

said sleeve being characterized by the absence, between the first opening and the stop, of any means for selectively securing the first length of electrical metallic tubing in fixed relationship with said sleeve; and said coupling being further characterized in that, when a terminal portion of the second length of electrical metallic tubing is received in said second opening and fixedly secured in relationship to said sleeve, the terminal portion of the first length of electrical metallic tubing is freely telescopingly movable in a substantially frictionless manner within said sleeve to thereby permit relative axial movement between the first and second lengths of electrical metallic tubing.

6. The expansion coupling of claim 5, wherein the wall of said sleeve is circumferentially indented to thereby define said stop.

\* \* \* \* \*

UNITED STATES PATENT AND TRADEMARK OFFICE
CERTIFICATE OF CORRECTION

PATENT NO. : 6,715,803 B1
DATED : April 6, 2004
INVENTOR(S) : Pahl

It is certified that error appears in the above-identified patent and that said Letters Patent is hereby corrected as shown below:

<u>Column 3,</u>
Line 25, please delete "sets-crew" and insert -- set-screw --.

Signed and Sealed this

Twenty-fifth Day of May, 2004

JON W. DUDAS
*Acting Director of the United States Patent and Trademark Office*